H. O. Elmer,
Sharpening Reciprocating Saws,
Nº 9,281. Patented Sep. 28, 1852.
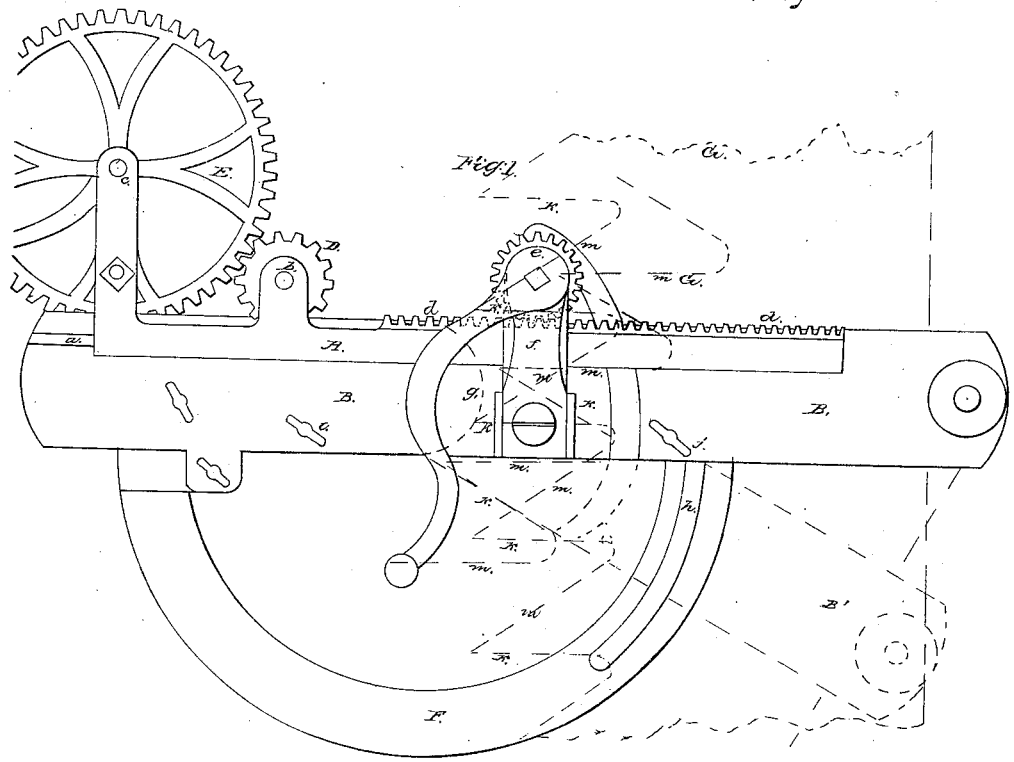
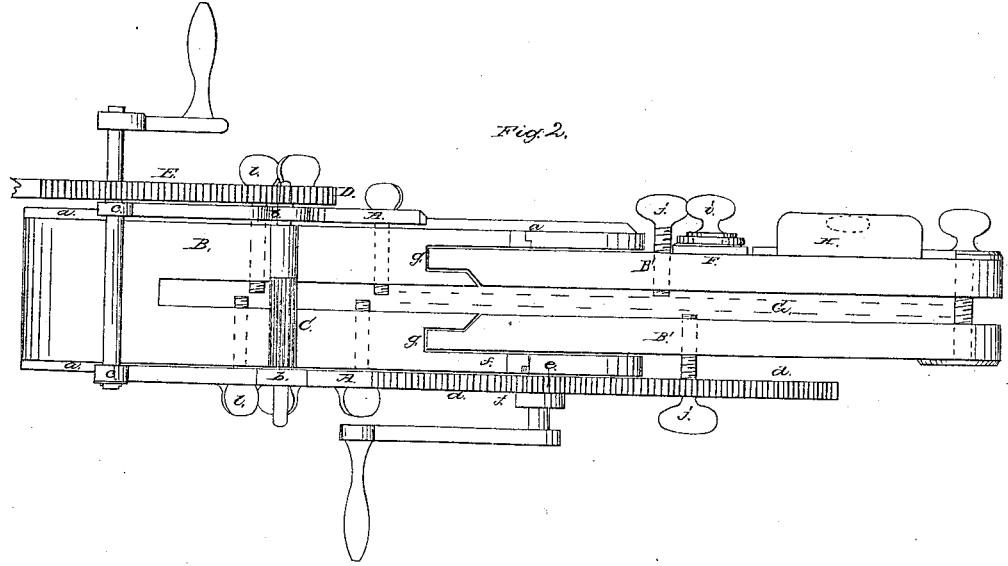

UNITED STATES PATENT OFFICE.

H. O. ELMER, OF MEXICO, NEW YORK.

JOINTED BED-PLATE SAW-GUMMER.

Specification of Letters Patent No. 9,281, dated September 28, 1852.

*To all whom it may concern:*

Be it known that I, H. O. ELMER, of Mexico, in the county of Oswego and State of New York, have invented a new and useful Improvement in Machines for Filing, Gumming, and Jointing Saws; and I do hereby declare that the following is a full, clear, and exact description of the construction of the same and the manner in which it is operated, reference being had to the annexed drawings, making a part of this specification, in which—

Figure 1, is a side elevation of the machine. Fig. 2, is a top or plan view of ditto.

Similar letters of reference indicate corresponding parts in each of the two figures.

The nature of my invention consists in the combination of a cylindrical cutter having a rotary motion and placed on a frame having a reciprocating and rectilinear motion with a jointed bed within which the saw to be filed and gummed is clamped. By which combination both the under and inclined faces of the teeth are filed perfectly true and the saw gummed and jointed, as will presently be shown.

To enable others skilled in the art to make and use my invention I will proceed to describe its construction and the manner in which it is operated.

A, represents a movable frame which works on projections (*a*) (*a*) which are attached to each side of a bed piece B. On this frame A, is a cylindrical cutter C, Fig. 2, placed transversely on the frame and running in suitable bearings (*b*) (*b*), the cutter having a rotary motion given it by means of the pinion D, on the axis of the cutter, said pinion receiving motion from a spur wheel E, which meshes into it and which also has its bearings (*c*) (*c*) in the frame A. The frame A, has a reciprocating rectilinear motion given it by means of a rack (*d*) and pinion (*e*) the rack being on one of the sides of the frame, and the pinion (*e*) which meshes into the rack having its bearing in standards (*f*) (*f*) attached to the bed piece B. Thus it will be seen that the cutter has a rotary motion given it by means of the pinion D, and spur wheel E, and said cutter being attached to the frame it also has with the frame a reciprocating rectilinear motion communicated to it by means of the rack (*d*) and pinion (*e*).

B, is the bed piece in which the saw to be filed and gummed is placed; this bed piece has a longitudinal slit through it to receive the saw and also has a joint (*g*) at about its center in consequence of which the part B′ of the bed piece can be depressed.

F, is a semicircular guide, attached to one side of the bed piece and projecting downward, see Fig. 1; this guide has a slot (*h*) in it through which a set screw (*i*) passes, see Fig. 2, and thence into the bed piece by means of this set screw and guide the part B′, may be secured at any desired degree of inclination.

G, (see red lines in Fig. 1, and black dotted lines in Fig. 2) represents the saw; this saw is clamped or secured in the part B′, of the bed piece vertically by means of the thumb screws (*j*) (*j*). Now when the part B′, of the bed piece is in line with the other portion B, or when the whole bed piece is perfectly horizontal and the saw consequently in a vertical position as seen by the solid red lines in Fig. 1, the under surfaces (*k*) of the teeth will be filed or cut perfectly horizontal upon giving the rotary motion to the cutter C, and the rectilinear motion to the frame A; this will be readily understood; now to cut the upper or inclined surfaces (*m*) of the teeth the part B′, of the bed piece is depressed (see black dotted lines in Fig. 1,) till the upper or inclined surfaces (*m*) of the saw teeth become horizontal (see red dotted lines); the part B′, is then secured in this inclined position by adjusting the set screw (*i*) and the cutter C, and frame A, again operated and the upper or inclined surfaces of the teeth will all be filed evenly and true. It will be seen that by depressing the part B′ of the bed piece, the saw G will be in an oblique position as it is clamped in the part B′, see dotted red lines in Fig. 1, and consequently the upper or inclined surfaces (*m*) of the saw teeth become, when the part B′ is depressed horizontal, as the surfaces (*k*) were when the saw was vertical, and the cutter C acts upon the surfaces (*m*) as it did upon the surfaces (*k*).

Those skilled in saw making will of course see that by the above machine the saw is not only filed but gummed and jointed. By jointing is meant the evenness of the teeth, all projecting out from the blade of the saw the same distance. By gumming is meant the cleaning out of the teeth, or in other words, forming the teeth of an equal size and also leaving the spaces between them of an equal size, as regards breadth and depth. When saws are filed by hand the front edges of the teeth become shorter at each operation; consequently in time the spaces between the teeth are cut out by means of dies, and this operation is commonly termed "gumming out." By using my machine the saw is filed, gummed and jointed, each tooth is correctly and evenly cut, and as the motions of the cutter are arbitrary the saw will necessarily be perfectly operated upon if correctly adjusted in the bed piece.

It may be well to state that I use a small level H, Fig. 2, which is attached to one side of the movable part B', of the bed piece and which airs or assists in adjusting properly the movable part B'.

The bed piece may be supported by a vertical support, not represented, passing into the longitudinal slit and secured by the set screws (*l*) (*l*); the bed piece may be moved on the standard by relaxing the screws (*l*) (*l*) or the saw may be moved by relaxing the screws (*j*) (*j*) so that the cutter may act successively upon the teeth. I do not confine myself however to any particular mode of doing this, viz, supporting the bed piece. Nor do I confine myself to the particular mode of construction of the several parts as herein described, but any other method substantially the same so long as the bed piece is jointed and one part capable of being clamped when in line or at an angle with the other part.

I do not claim the cylindrical cutter C separately as that has been previously used, but

Having thus described the nature of my invention and the manner in which it is operated, what I claim as new and desire to secure by Letters Patent, is—

The employment or use of the cylindrical cutter C, said cutter having a rotary and also a reciprocating rectilinear motion in combination with the jointed bed piece B, in which the saw is placed, the cutter C, having the above motions communicated to it in the manner as described or in an equivalent way, and the bed piece being constructed substantially as shown and described; by which combination saws may be filed, gummed, and jointed in an expeditious and proper manner as set forth.

HOSEA O. ELMER.

Witnesses:
 CHESTER HENRY,
 CHAUNCY S. PORTER.